July 26, 1938.

C. W. BECK

STEERING WHEEL

Original Filed Feb. 6, 1928

Re. 20,807
Orig. 2,041,738

Inventor

Charles W. Beck

By Owen & Owen

Attorneys

74. MACHINE ELEMENTS
AND MECHANISMS

Examiner

552 Reissued July 26, 1938 Re. 20,807

UNITED STATES PATENT OFFICE 20,807

STEERING WHEEL

Charles W. Beck, Toledo, Ohio, assignor, by mesne assignments, to Nellie M. Beck, Toledo, Ohio Original No. 2,041,738, dated May 26, 1936, Serial No. 252,251, February 6, 1928. Divided and this application January 2, 1936, Serial No. 57,230. Application for reissue August 26, 1936, Serial No. 97,992

4 Claims. (Cl. 74—552)

This invention relates to steering wheels for motor vehicles, boats and the like and has particular reference to wheels wherein a solid metallic spider consisting of a hub, spokes and rim is formed of metal and is covered with composite material such, for example, as hard rubber.

This application is a division and continuation of my co-pending application, Serial No. 252,251, filed February 6, 1928, and entitled "Steering wheel", patented May 26, 1936, No. 2,041,738.

Heretofore, in the manufacture of wheels formed of hard rubber, serious difficulty has been experienced in constructing a wheel having the necessary strength and durability to resist the shocks and jars incident to operation without shattering.

The primary object of my invention is to eliminate the difficulty by forming the wheel with a major bulk of composition material such as hard rubber, in which is embedded an integrally built-up metallic spider acting therein substantially as one piece and so associated with the covering material that these mutually reinforcing components together form a unitary, substantially non-shattering structure fully capable of withstanding the strains and shocks to which a steering wheel is subjected.

Another object of the invention is to provide a wheel of the above character distinguished by the simplicity of its construction and the economical manner in which the same may be manufactured.

While many prior attempts have been made to obtain a relatively inexpensive and satisfactory steering wheel employing a metallic spider with a plastic covering thereon, my present invention is believed to represent the first practical realization of that result through the use of a built-up metallic spider including a hub, an annular rim reinforcing member and separately-formed spoke reinforcing members having substantially integral joints with the hub and rim members, together with composition material of the nature of hard rubber, embedding the spider and making therewith a unitary structure which is substantially non-shattering.

Figure 1:
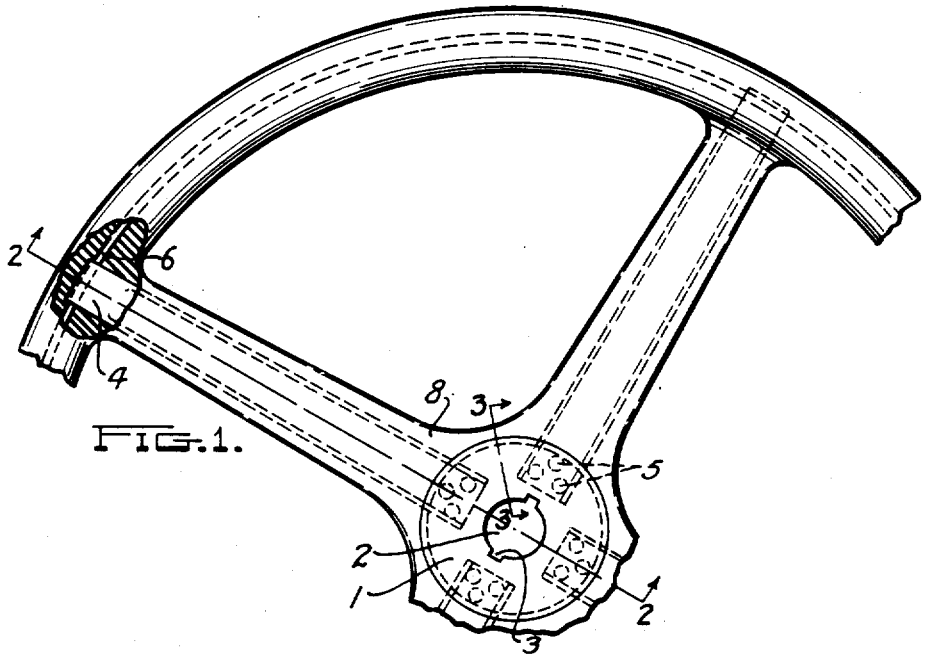
Figure 2:
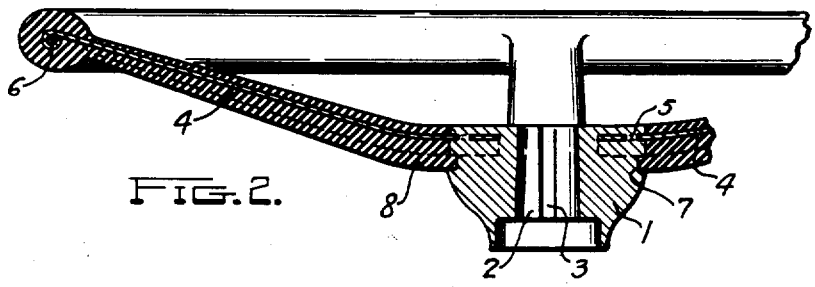
Figure 3:
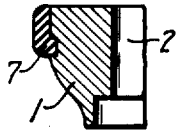

Other objects and advantages of the invention will become apparent as the description proceeds, reference being had to the accompanying drawing, in which Fig. 1 is a fragmentary, plan view of a wheel embodying the present invention; Fig. 2 is a section on line 2—2 of Fig. 1; and Fig. 3 is a fragmentary section taken on line 3—3 of Fig. 1.

Referring to the drawing, the steering wheel embodying my invention is preferably formed of a steel frame covered with a suitable plastic, such as hard rubber, and comprises a hub 1 having a central tapered bore 2 adapted to receive a steering shaft of a motor vehicle and being provided with keyways 3 for such purpose. Radiating from the hub 1 are solid metallic spoke members 4. The spokes are made integral with the hub 1, in the present instance by being cast therein and for this purpose are provided with holes 5 through which the metal of the hub may flow so as to anchor the spokes firmly in the hub. The spokes may be formed of any suitable, solid metallic section and in the present instance are shown as channel shaped, since the depending flanges of the channels impart added rigidity to the spokes. It will thus be seen that the spokes extend into the hub within the periphery thereof so as to be firmly anchored.

At their outer ends the spokes are connected to a solid annular rim ring 6. The ring 6 is preferably an endless rod of circular cross-section and the spokes are fixed thereto in any suitable manner, as by crimping the spokes around the rim or by welding. In any event, it is preferred to so attach the rim 6 to the spokes as to constitute an integral connection.

In the process of construction, the solid metallic spider which consists of the hub 1, the spokes 4 and the rim 6, is placed in a suitable mold and the desired covering material such as rubber is placed into the mold embedding the spider. The covering material is then vulcanized or otherwise hardened about the spider to form a sheath 8 over the rim, spokes and hub of the wheel, so disposed that the inner end portions of the spokes 4 definitely extend across the joint formed by and between the hub 1 and the sheath or covering 8.

As shown in Fig. 1, the hub 1 is provided with an annular recess 7 into which the covering material is permitted to flow so as to firmly anchor the same against radial displacement. It will be appreciated that this feature may be omitted in some instances and the covering secured in any suitable manner.

It will be seen that a wheel construction in accordance with the present invention requires no further operations before being placed directly on the steering shaft of an automobile or similar vehicle. Further, the wheel is characterized by the absence of fastening elements for the various metallic parts which are apt to work loose or shear off in case of an accident. The wheel may be made exceedingly strong by increasing the cross-sectional area of the metallic section used for the spider and the strength is not impaired by the use of screws, rivets or the like.

A wheel skeleton or spider built up of separate hub, spoke and rim pieces, in the described or any equivalent manner, employing rim and spoke reinforcing members of solid section and having substantially integral joints which will not loosen through the leverage exerted thereon, especially at the connections between the hub and spoke members, has been found to possess the necessary strength and is cheaper than a spider made in one or two pieces. By embedding such a spider in a plastic composition material whose characteristics are mainly that of hard rubber, which has a fluent phase during vulcanization and becomes intimately bonded to the metal, and employing a spoke and rim section whose bulk or mass is mainly hard rubber, thus avoiding relatively thin or shell-like coverings of the plastic, cracking of the covering is avoided, the metal and plastic mutually reinforce each other, the external contour is defined by the molded plastic rather than the spider, as in wheels made with a poorly adhering, thin cellulosic covering, whose strength and bulk are principally that of the spider, and a substantially non-shattering unitary steering-wheel structure of metal and hard, molded composition material is attained.

While the invention has been disclosed in connection with a particular form and arrangement of the parts, it will be appreciated that various modifications and changes may be made without departing from the invention as defined in the appended claims.

I claim:

1. A steering wheel comprising composition material rim, spoke and hub portions, and a metallic reenforcement for the said wheel, said reenforcement comprising a hub, spokes extending radially of the hub and positively connected thereto, and a rim member connecting the outer ends of the spokes, the hub of the reenforcement being provided with a bore whereby the same may be mounted directly on a steering shaft, the rim and spokes of the reenforcement being embedded within the said composition rim and spoke portions, and the hub of the reenforcement being surrounded by the said composition hub portion, the said connection between the reenforcing spokes and hub being free of the said composition material.

2. A steering wheel as set forth in claim 1 wherein the composition spokes and the reenforcement together are of solid formation in cross-section.

3. A steering wheel in accordance with claim 1 in which the composition hub portion which surrounds the reenforcing hub is anchored to the latter by the reenforcing spokes so as to prevent relative movement between said composition hub and reenforcing hub.

4. A steering wheel comprising composition rim, spoke and hub portions, and a metallic reenforcement comprising a hub, radial spokes extending into the hub and positively connected thereto, and a rim member connecting the outer ends of the spokes, the hub of the reenforcement being provided with a bore whereby the same may be mounted directly on a steering shaft, the rim and spokes of the reenforcement being embedded within the said composition rim and spoke portions, and the hub of the said reenforcement being surrounded by the said composition hub portion.

CHARLES W. BECK.